US011462119B2

(12) United States Patent
Slivka et al.

(10) Patent No.: US 11,462,119 B2
(45) Date of Patent: *Oct. 4, 2022

(54) SYSTEM AND METHODS FOR ADAPTING LESSONS TO STUDENT NEEDS

(71) Applicant: Dreambox Learning, Inc., Bellevue, WA (US)

(72) Inventors: Benjamin W. Slivka, Clyde Hill, CA (US); Lou Gray, Bellevue, WA (US); Roy Leban, Redmond, WA (US); Nigel J. Green, Bellevue, WA (US); Daniel R. Kerns, Mercer Island, WA (US); Neil Smith, Redmond, WA (US); Mickelle Weary, Kirkland, WA (US); Cristopher Cook, Seattle, WA (US); Cheryl A. Dodge, Sacramento, CA (US); Ronald Anthony Kornfeld, Seattle, WA (US)

(73) Assignee: DreamBox Learning, Inc., Bellevue, WA (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/505,435

(22) Filed: Jul. 8, 2019

(65) Prior Publication Data
US 2019/0333403 A1   Oct. 31, 2019

Related U.S. Application Data

(63) Continuation of application No. 11/777,998, filed on Jul. 13, 2007, now Pat. No. 10,347,148.

(Continued)

(51) Int. Cl.
*G09B 7/08* (2006.01)

(52) U.S. Cl.
CPC ..................... *G09B 7/08* (2013.01)

(58) Field of Classification Search
None
See application file for complete search history.

(56) References Cited

U.S. PATENT DOCUMENTS

| 5,597,312 A * | 1/1997 | Bloom | G09B 7/04 434/362 |
| 5,904,485 A * | 5/1999 | Siefert | G09B 5/14 434/322 |

(Continued)

OTHER PUBLICATIONS

Du Jin; "A Method for Learner Grouping Based on Personality Clustering"; Proceedings of the 10th International Conference on Computer Supported Cooperative Work in Design; https://ieeexplore.ieee.org/stamp/stamp.jsp?arnumber=4019242&tag=1; Dec. 2006 (Year: 2006).*

(Continued)

*Primary Examiner* — James B Hull
(74) *Attorney, Agent, or Firm* — Perkins Coie LLP

(57) ABSTRACT

In one embodiment, the invention discloses a method for adapting educational content. The method comprises generating data for each of a plurality of students, the data pertaining to an aspect of the student's interaction with an educational system; combining the generated data to form a combined data set; analyzing the combined data set to identify clusters, each representing similar students according to a mathematical model; and adapting the educational system to provide a customized learning experience for a particular student based on an identified cluster.

30 Claims, 6 Drawing Sheets

Related U.S. Application Data

(60) Provisional application No. 60/883,416, filed on Jan. 4, 2007, provisional application No. 60/830,937, filed on Jul. 14, 2006.

(56) References Cited

U.S. PATENT DOCUMENTS

| | | | | |
|---|---|---|---|---|
| 6,032,141 A * | 2/2000 | O'Connor | G09B 7/04 | 434/107 |
| 6,039,575 A * | 3/2000 | L'Allier | G09B 7/04 | 434/118 |
| 6,067,538 A * | 5/2000 | Zorba | G06Q 20/102 | 434/118 |
| 6,077,085 A * | 6/2000 | Parry | G09B 19/06 | 434/322 |
| 6,144,838 A * | 11/2000 | Sheehan | G09B 7/02 | 434/118 |
| 6,148,174 A * | 11/2000 | Remschel | G09B 5/10 | 434/322 |
| 6,149,441 A * | 11/2000 | Pellegrino | G09B 7/02 | 434/118 |
| 6,164,975 A * | 12/2000 | Weingarden | G09B 7/04 | 434/118 |
| 6,186,794 B1 * | 2/2001 | Brown | G09B 7/02 | 340/4.12 |
| 6,260,033 B1 * | 7/2001 | Tatsuoka | G01R 31/318371 | 434/322 |
| 6,270,351 B1 * | 8/2001 | Roper | G09B 7/02 | 434/118 |
| 6,287,123 B1 * | 9/2001 | O'Brien | G09B 7/02 | 434/118 |
| 6,315,572 B1 * | 11/2001 | Owens | G09B 7/00 | 434/118 |
| 6,322,366 B1 * | 11/2001 | Bergan | G09B 7/02 | 434/118 |
| 6,361,326 B1 * | 3/2002 | Fontana | G09B 7/02 | 434/236 |
| 6,371,765 B1 * | 4/2002 | Wall | G09B 5/00 | 434/224 |
| 6,419,496 B1 * | 7/2002 | Vaughan, Jr. | G09B 7/02 | 434/118 |
| 6,471,521 B1 * | 10/2002 | Dornbush | G09B 5/14 | 434/322 |
| 6,505,031 B1 * | 1/2003 | Slider | G09B 5/02 | 434/118 |
| 6,527,556 B1 * | 3/2003 | Koskinen | G09B 19/18 | 434/219 |
| 6,554,618 B1 * | 4/2003 | Lockwood | G09B 7/00 | 434/118 |
| 6,652,283 B1 * | 11/2003 | Van Schaack | G09B 7/00 | 434/236 |
| 6,782,396 B2 * | 8/2004 | Greene | G09B 7/00 | 434/323 |
| 6,907,223 B2 * | 6/2005 | Murphy | G09B 7/00 | 434/118 |
| 6,968,152 B2 * | 11/2005 | Scharf | G09B 5/00 | 434/118 |
| 7,117,189 B1 * | 10/2006 | Nichols | G06F 9/453 | 706/45 |
| 7,568,160 B2 * | 7/2009 | Berger | G09B 5/00 | 434/167 |
| 8,092,227 B2 * | 1/2012 | Roschelle | G09B 7/00 | 434/322 |
| 8,380,121 B2 * | 2/2013 | Bradford | G09B 7/00 | 434/322 |
| 8,457,544 B2 * | 6/2013 | German | G06Q 30/02 | 434/350 |
| 2001/0031456 A1 * | 10/2001 | Cynaumon | G09B 7/02 | 434/350 |
| 2002/0042041 A1 * | 4/2002 | Owens | G09B 7/04 | 434/322 |
| 2002/0045154 A1 * | 4/2002 | Wood | G09B 23/28 | 434/350 |
| 2002/0081561 A1 * | 6/2002 | Skeans | G09B 7/00 | 434/322 |
| 2002/0098468 A1 * | 7/2002 | Barrett | G09B 7/08 | 434/322 |
| 2002/0138456 A1 * | 9/2002 | Levy | G06Q 30/02 | 706/25 |
| 2002/0142278 A1 * | 10/2002 | Whitehurst | G09B 7/04 | 434/350 |
| 2002/0182573 A1 * | 12/2002 | Watson | G09B 19/00 | 434/236 |
| 2002/0187463 A1 * | 12/2002 | Aspe | G16H 10/60 | 434/362 |
| 2002/0188583 A1 * | 12/2002 | Rukavina | G09B 5/00 | 706/45 |
| 2003/0003433 A1 * | 1/2003 | Carpenter | G09B 7/04 | 434/323 |
| 2003/0014400 A1 * | 1/2003 | Siegel | G09B 5/00 | |
| 2003/0017442 A1 * | 1/2003 | Tudor | G09B 7/04 | 434/322 |
| 2003/0129574 A1 * | 7/2003 | Ferriol | G09B 7/04 | 434/362 |
| 2003/0152903 A1 * | 8/2003 | Theilmann | G09B 5/00 | 434/350 |
| 2003/0152904 A1 * | 8/2003 | Doty, Jr. | G09B 7/00 | 434/350 |
| 2003/0154176 A1 * | 8/2003 | Krebs | G09B 5/00 | 706/59 |
| 2003/0207242 A1 * | 11/2003 | Balasubramanian | G09B 7/00 | 434/322 |
| 2004/0005536 A1 * | 1/2004 | Lai | G09B 7/04 | 434/322 |
| 2004/0009461 A1 * | 1/2004 | Snyder | G09B 7/02 | 434/350 |
| 2004/0014017 A1 * | 1/2004 | Lo | G09B 19/06 | 434/322 |
| 2004/0018479 A1 * | 1/2004 | Pritchard | G09B 7/02 | 434/350 |
| 2004/0033475 A1 * | 2/2004 | Mizuma | G06Q 10/06 | 434/219 |
| 2004/0115596 A1 * | 6/2004 | Snyder | G09B 7/02 | 434/118 |
| 2004/0161728 A1 * | 8/2004 | Benevento, II | G06Q 50/205 | 434/118 |
| 2004/0202987 A1 * | 10/2004 | Scheuring | G09B 7/02 | 434/118 |
| 2004/0210661 A1 * | 10/2004 | Thompson | G06Q 30/02 | 709/228 |
| 2004/0214153 A1 * | 10/2004 | McCormick | G09B 19/06 | 434/350 |
| 2004/0219502 A1 * | 11/2004 | Bechard | G09B 7/02 | 434/322 |
| 2004/0224291 A1 * | 11/2004 | Wood | G09B 17/006 | 434/155 |
| 2005/0026131 A1 * | 2/2005 | Elzinga | G09B 5/00 | 434/365 |
| 2005/0186550 A1 * | 8/2005 | Gillani | G09B 7/02 | 434/322 |
| 2005/0221268 A1 * | 10/2005 | Chaar | G09B 7/02 | 434/350 |
| 2006/0029920 A1 * | 2/2006 | Bruno | G09B 7/06 | 434/323 |
| 2006/0050865 A1 * | 3/2006 | Kortum | G06F 9/453 | 379/265.07 |
| 2006/0068367 A1 * | 3/2006 | Parke | G09B 5/00 | 434/362 |
| 2006/0099563 A1 * | 5/2006 | Liu | G09B 7/02 | 434/350 |
| 2006/0127871 A1 * | 6/2006 | Grayson | G09B 7/02 | 434/350 |
| 2006/0166174 A1 * | 7/2006 | Rowe | G09B 5/06 | 434/236 |
| 2006/0240394 A1 * | 10/2006 | Smith | G09B 7/00 | 434/322 |
| 2006/0286531 A1 * | 12/2006 | Beamish | G09B 7/07 | 434/323 |

(56) References Cited

U.S. PATENT DOCUMENTS

| | | | | |
|---|---|---|---|---|
| 2006/0286533 | A1* | 12/2006 | Hansen | G09B 7/00 434/323 |
| 2006/0286538 | A1* | 12/2006 | Scalone | G09B 7/00 434/350 |
| 2008/0038705 | A1* | 2/2008 | Kerns | G09B 7/08 434/309 |
| 2008/0038708 | A1* | 2/2008 | Slivka | G09B 7/08 434/350 |
| 2008/0261191 | A1* | 10/2008 | Woolf | G06Q 50/20 434/323 |

OTHER PUBLICATIONS

Rodrigo; Use of Unsupervised Clustering to Characterize Learner Behaviors and Affective States while Using an Intelligent Tutoring System; https://www.upenn.edu/learninganalytics/ryanbaker/ICCE-Clustering.pdf; Dec. 2007 (Year: 2007).*

* cited by examiner

200 → 210

Event ID: 9182375516
Student ID: 372149
Lesson ID: 5623
Date/Time: 07/07/2007 4:13 PM
Event: Incorrect
Problem: 3+4 = ?
Class: Multiple choice
Choices: 4, 6, 7
Response: 6
Response Time: 0.3s
Audio response: Nice try, but you can do better.

Event ID: 9182375517
Student ID: 372149
Lesson ID: 5623
Date/Time: 07/07/2007 4:14 PM
Event: Choice Made then Changed
Problem: 8-3 = ?
Class: Multiple choice
Choices: 3, 5, 7
Choice Made: 7
Response Time: 0.1s Event ID: 9182375518
Student ID: 372149
Lesson ID: 5623
Date/Time: 07/07/2007 4:14 PM
Event: Correct
Problem: 8-3 = ?
Class: Multiple choice
Choices: 3, 5, 7
Response: 5
Response Time: 0.1s
Audio response: Great work!

Event ID: 9182375519
Student ID: 372149
Lesson ID: 5623
Date/Time: 07/07/2007 4:15 PM
Event: Stalled
Condition: Inactive
Problem: 9-7 = ?
Class: Multiple choice
Choices: 1, 2, 4
Response Time: 2.0s

SYSTEM AND METHODS FOR ADAPTING LESSONS TO STUDENT NEEDS

CROSS REFERENCE TO RELATED APPLICATION

This application is a Continuation of U.S. patent application Ser. No. 11/777,999, filed on Jul. 13, 2007, which claims the benefit priority to US Provisional Patent Application Nos. 60/830,937 filed Jul. 14, 2006 and 60/883,416 filed Jan. 4, 2007, all of which are hereby incorporated by reference in their entireties.

FIELD

Embodiments of the invention relate generally to the field of education, and more specifically to the field of delivering educational content, including lessons, to students using technological means.

BACKGROUND

Educational systems utilizing computers may be used to provide educational content to learners. Such educational content may include multimedia content rich in, e.g. sound, graphics, video, etc. to provide a compelling learning experience. To ensure optimal learning, such educational systems may benefit from adapting the educational content to suit the preferences, learning styles, and requirements of particular learners.

SUMMARY

In one embodiment, the invention discloses a method for adapting educational content. The method comprises generating data for each of a plurality of students, the data pertaining to an aspect of the student's interaction with an educational system; combining the generated data to form a combined data set; analyzing the combined data set to identify clusters, each representing similar students according to a mathematical model; and adapting the educational system to provide a customized learning experience for a particular student based on an identified cluster.

In another embodiment, the invention discloses an educational system for delivering lessons adapted in accordance with the above method.

Other aspects of the present invention will become apparent from the detailed description below.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 2 shows an exemplary event stream recording, in accordance with one embodiment of the invention.

DETAILED DESCRIPTION

Figure 1:
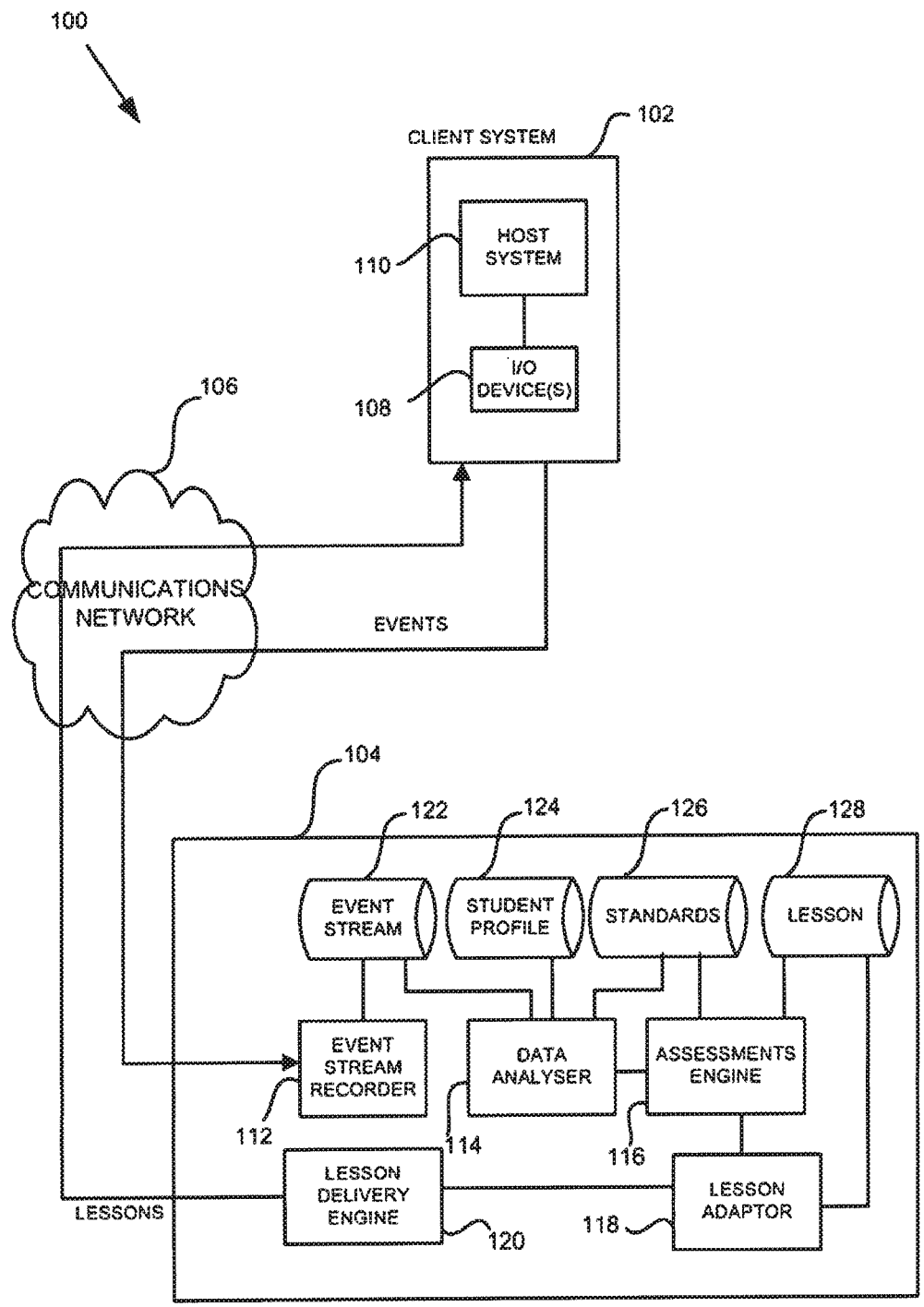
FIG. 1 shows a network environment within which embodiments of the present invention may be practiced, the environment including a client system and a server system in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the following description contains many specifics for the purposes of illustration, one skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Throughout this description, the present invention will be described using terminology of computers, personal computers, and the Internet, along with terminology related to current educational methods and systems. However, one skilled in the art will appreciate that such terminology is intended to be non-limiting.

Broadly, embodiments of the invention disclose an educational system and techniques for adapting educational content within the educational system to provide a customized learning experience for an individual learner or student. In accordance with the techniques, data for a large number of students who have interacted with the educational system is analyzed to identify clusters, each representing students that are similar according to a mathematical model. For learners within an identified cluster, cluster-based adaptations of the educational content may be applied to the educational content. These adaptations occur with no or minimal work on the part of lesson authors.

Nothing in the invention prevents the system from being used in concert with data provided by teachers and lesson authors in the form of "seed data". Such seed data may be used in order to allow the system to start functioning before sufficient data is available. This pre-populated seed data will be quickly supplanted by real data collected from students and derived from such collected data. Thus, the clusters may be the fruit of a combination of human knowledge in the form of expert/teacher knowledge and machine learning.

Figure 6:
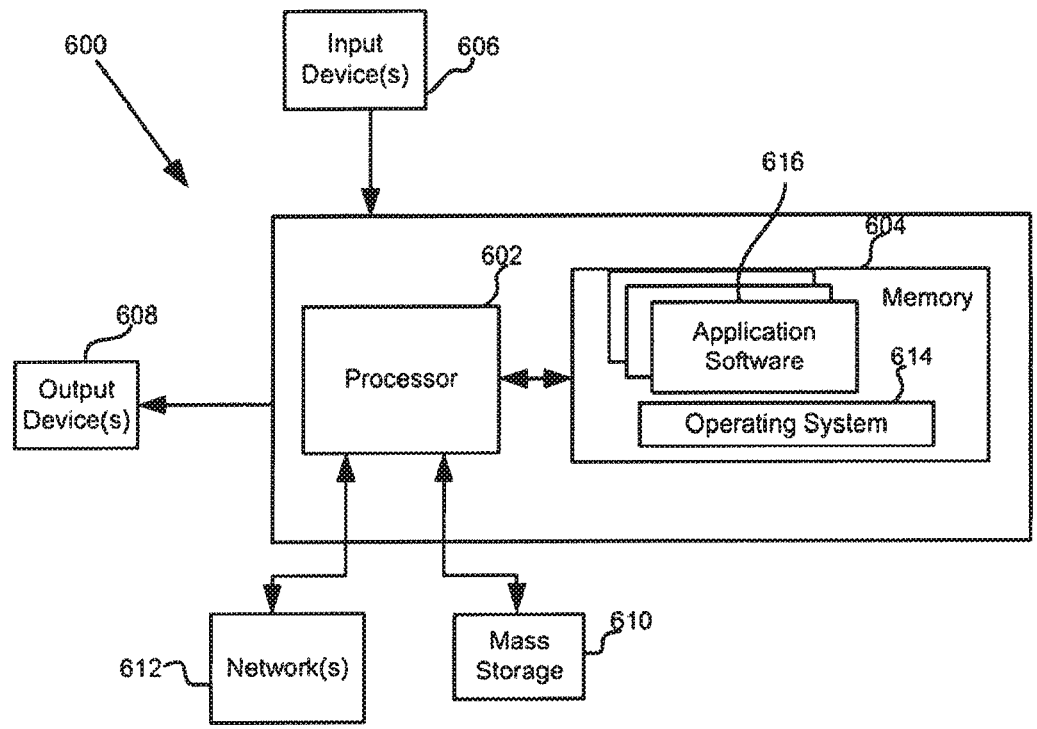
FIG. 6 shows a high-level block diagram of hardware that may be used to implement any of the client systems, or server systems of the present invention

Turning now to FIG. 1 of the drawings, there is shown an environment 100 within which embodiments of the invention may be practiced. As will be seen, the environment 100 comprises a client system 102 coupled to a server system 104 via a communications network 106. The client system 102 may represent any client computing device including e.g. a personal computer (PC), a notebook computer, a smart phone, etc. At least conceptually, the client system 102 may be thought of as including one or more input/output (I/O) devices 108 coupled to a host system 110. In accordance with different embodiments, the I/O devices 108 may include input devices such as a computer mouse or pen, a touch-sensitive screen, joystick, data gloves, and a keyboard. Additionally, the input devices 108 may further comprise input devices for capturing biometric information pertaining to a learner. The latter category of input devices may include a camera for facial expression detection and for eye motion capture/detection, a voice recorder, and a heart rate monitor. The I/O devices 108 may include output devices such as a display, a sound playback device, or a haptic device for outputting braille. Hardware that may be used to realize the client system 102, in accordance with one embodiment, is illustrated in FIG. 6 of the drawings. Although in FIG. 1 of the drawings only one client system 102 is shown, it is to be understood that in practice several such client systems 102 may be coupled to the server system 104 via the communications network 106.

In a broad sense, the communications network 106 represents any network capable of bridging communications between the client system 102 and the server system 104. For purposes of the present description, the communications network 106 is to be understood to include a Wide-Area Network (WAN) in the form of the World Wide Web (WWW) or the Internet as it is commonly referred to. Given that the communications network 106, in one embodiment, includes the Internet, the server system 104, in one embodiment, may comprise a Web server housed in a data center. In one embodiment, the server system 104 may be implemented as a server farm or server cluster. Such a server farm may be housed in a single data center or in multiple data centers.

At a high-level, the server system 104 provides educational content in the form of lessons that are executed on the client system 102. Responsive to the execution of the lessons, the client system 102 records events that are sent back to the server system 104 in the form of an event stream.

Broadly, in one embodiment, the event stream comprises events selected from the group consisting of student-generated events, system-generated events, and biometric information pertaining to a student. For example, the event stream may comprise a record of every action that a student/learner has performed, including both high-level and low-level actions. High-level actions may include, answering a problem correctly or incorrectly, and making a choice when presented with multiple actions. Turning now to FIG. 2 of the drawings, there is shown an exemplary event stream recording, in accordance with one embodiment. As will be seen, the event stream recording comprises recorded events 200. Each recorded event 200 contains a set of named properties 210, each of which has an associated value or set of values 220. In one embodiment, the named properties 210 comprise an event identifier, a student identifier, a lesson identifier, the date and time of the event and the type of the event. In addition, as much information as is available will be recorded as additional property values.

In one embodiment, such information may include the exact problem presented, the exact steps (correct or incorrect) that the student took to answer the problem, the incorrect answer given, the response i.e. the time it took to answer (tied or untied to whether the answer was right or wrong), first, second, and other derivatives of the response time, whether the student asked for a hint, the exact audio the student was given. At the low-level, events may include mouse or pen clicks, drags, and motion, keystrokes, voice input, and requests for help by the student, the length of time that the student has been using the computer, as well as biometric information pertaining to the student. Such biometric information may include the student's facial expression, eye movement, and physiological data e.g., heart rate, respiration, electrocardiogram (EKG), blood pressure, stress level, hydration level, and an indication of when the student last consumed a meal. In one embodiment, the event stream may also include a history of every screen, problem, image, audio, and video element the student experienced.

In some cases, the event stream it may also include demographic data comprising direct information about the student, the student's surroundings, the time of day, climate and current weather at the student's residence.

Advantageously, in one embodiment it is possible to dynamically change the quantity and quality of data that is recorded on an ongoing and immediate basis, based on a variety of factors. Such factors may include the product being used, the lessons being used, lesson evaluation criteria, and student profile options.

Focusing now on the server system 104, it will be seen that the server system 104 includes as its functional components an event stream recorder 112, a data analyzer 114, and assessments engine 116, a lesson adaptor 118, and a lesson delivery engine 120. Additionally, the server system 104 comprises several databases including an event stream database 122, a student profile database 124, a standards database 126, and a lesson database 128. Hardware that may be used to realize or implement the server system 104, in accordance with one embodiment of the invention, is illustrated in FIG. 6 of the drawings. In one embodiment, the server system 104 may be housed in a data center and may serve a large number of students.

In one embodiment, the student profile database 124 comprises individual student profiles. By way of example, each student profile may comprise personal information such as a student's age, gender, geographic location, interests and hobbies, etc. Learning objectives or goals in the form of minimum standards set by a standards authority may be resident in the standards database 126, in accordance with one embodiment. Examples of the standards authority include State and local educational departments. The system 104 may also include lessons stored in the lesson database 128. As will be described in greater detail below, in one embodiment lessons in the lesson database 128 are customized or adapted by the lesson adapter 118 based on clusters of similar learners known to the system 104.

In one embodiment, the server system 104 receives event streams from a number of client systems 102. The event streams may be compiled into a single database for data analysis and data mining, allowing the system to identify both obvious and subtle similarities and differences between individual students and thereby to offer many different learning experiences, each customized or adapted to a particular student.

In some cases, the server system 104 may be pre-populated with "seed data" based on input from subject matter experts, but the data mining rapidly converges on data that accurately represents the experiences of real students. In such cases the clusters may be viewed as the fruit of a combination of human knowledge in the form of expert/teacher knowledge and machine learning.

As a result, the system 104 uniquely allows researchers to conduct experiments on historical data, to construct and offer experiments for current students in real time, to conduct such experiments without adversely affecting the quality of the educational materials delivered to the students, and to combine the analysis of such new experiments with historical data.

In describing the operations of the server system 104 in accordance with the invention, examples are provided in English, and specific domains of knowledge referred to. However, it is to be appreciated that the inventive techniques and systems of the present invention are independent of particular domains of knowledge and particular languages. Thus, for example, the techniques and systems disclosed herein may be used to provide educational content to learners in the form of a three-year-old learning her letters, a sixteen-year-old preparing for the SAT test, a twenty-five year old preparing to take the Washington State Bar Examination, or a seventy-year-old preparing for a driver's license examination. In the above examples, the learning may be in any language. Moreover, the learners themselves may be in any country.

In some embodiments, the system 104 may be implemented as a single data server that can serve multiple countries, languages, and domains of knowledge.

In use, the event stream recorder 112 generates multiple event streams and, in one embodiment, combines multiple event streams into a combined data set to be stored in the event stream database 122. Each of the event streams comprises data pertaining to aspects of a particular student's interaction with the system 106. The data is recorded by each of the client systems 104 and transmitted to the event stream recorder 112.

Figure 3:
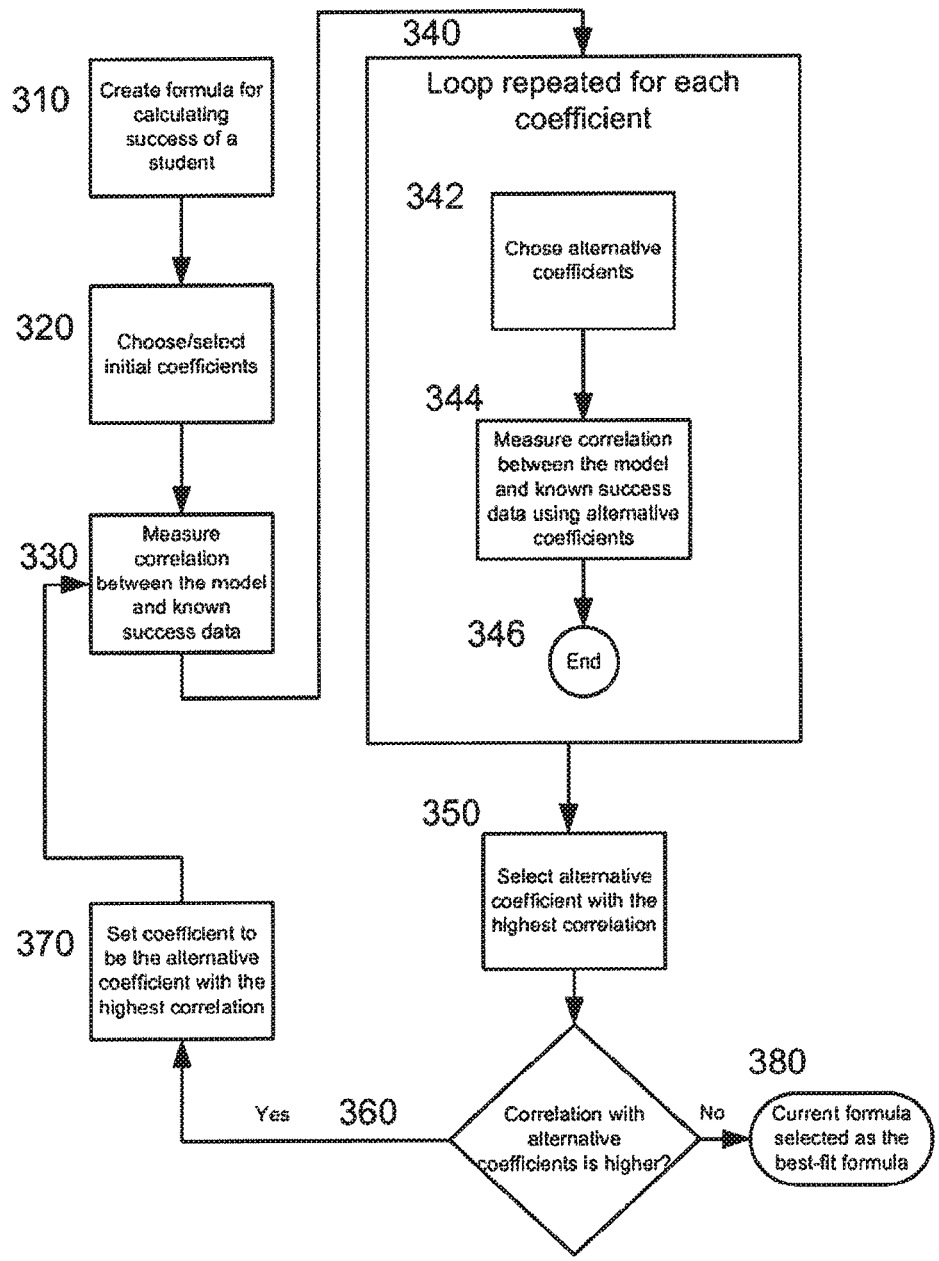
FIG. 3 shows an exemplary process for fitting a model, in accordance with one embodiment of the invention.

Once the event streams have been combined as described above, the data analyzer 114 analyzes the combined data set to identify clusters, each representing similar students according to a mathematical model. In one embodiment, analyzing the combined data set to identify clusters comprises fitting a model (sometimes referred to as a curve or formula), such as a linear model or Bayes classifier, to the combined data set. One method of fitting such a model involves successive approximation of terms and coefficients by checking the model against the data and adjusting it, essentially training the model to match the data. FIG. 3 of the drawings shows an exemplary process for fitting such a model, in accordance with one embodiment. Once a model is trained, it may be used to predict future data, a process similar to pattern recognition. In one embodiment, model training is not a discrete event and can happen continuously as new data becomes available. In addition, model training can happen continuously without new data in an attempt to improve the model. The model is, in essence, a series of constantly adjusted and improved models over time, rather than a single, fixed model.

FIG. 3 shows an exemplary process for fitting such a model, in accordance with one embodiment of the invention. In step 310, a formula is created for calculating success of a student at a lesson with variable coefficients wherein each variable is a measurable data point from a lesson. In step 320, initial coefficients are chosen and the formula is evaluated with the initial coefficients. These coefficients may be chosen randomly, but picking "good guesses" will help the system fit the model faster. In step 330, the correlation between the model and known success data is measured. In step 340, a number of substeps are repeated for each of the coefficients. In step 342, alternate coefficients for each coefficient (the "current coefficient") are chosen. One of the alternative coefficients is higher while another is lower than the current coefficient. The formula is then evaluated using the alternative coefficients. In step 344, the correlation between the model and known success data is measured for each of the alternate coefficients and these correlations are saved along with the alternate coefficients. In step 346, the subprocess ends and the loop moves to the next coefficient. When all coefficients have been processed, in step 350, the alternate coefficient with the highest correlation is selected. In step 360, the correlation of the selected alternate coefficient is compared with the original correlation calculated in step 330. If the correlation is higher, the formula is modified at step 370 to use the alternate coefficients and the process returns to step 330. Otherwise, the process ends in step 380 with the current formula being chosen as the best fit formula.

Note that this process is for fitting a single model to all data. In most embodiments, multiple models will be fitted to the data, but the basic process is similar to that described in FIG. 3.

Advantageously, there is not a single type of model in use, nor is it possible to choose a single model type without regard to the actual data being mined. Instead, embodiments of the invention utilize a variety of modeling techniques in an attempt to find the one which fits best, and additional modeling techniques can be substituted in at any time. In some embodiments different models are used in different situations based on a situation-dependent differentiation criterion. Examples of the situation-dependent differentiation criteria include subject matter and student-specific information such as gender, school district, and geographic location. Given a model that is appropriate for a particular situation, it is possible to identify clusters of students that meet particular patterns. Some of these patterns might indicate what are referred to as learning styles, but they may indicate other reasons for why students are similar. Students will get grouped based on the similarity of their outcomes, but they may also get grouped for other reasons. The system 104 need not have names for these clusters, nor is it necessary to ask students or anybody else about whether a given student is in the cluster or not. Given the clusters, the student's behavior or learning outcome in a given situation can be predicted based on the behavior of other students in the cluster. Thus, it is not necessary to actually map the clusters to particular learning conditions or styles. It is only necessary to identify clusters or groups of students who are similar to a particular student so that cluster-specific lesson adaptations may be generated by the lesson adapter 118 before delivery of the adaptations by the lesson delivery engine 120 a client system 104 for the particular student.

In one embodiment, cluster detection involves partitioning the combined data set into subsets or clusters so that the students in each subset share a common trait or traits. In some cases, the process of cluster detection may involve the use of the entire combined data set, whereas in other cases only a subset or representative sample of the data set may be used. In such a case, actual clusters are not created. Instead, whenever it is desired to know which cluster or clusters a student is in, the formulas and conditions used to determine the clusters in the subset or representative sample are used dynamically to determine which clusters a student is in.

In one embodiment, the subsets or clusters are not mutually exclusive, as a student might be in multiple subsets or clusters. In some cases, the cluster detection process may be modified so that the clusters are mutually exclusive. In one embodiment, a technique known as "fuzzy clustering" may be used. With fuzzy clustering each student's degree of membership in a cluster is calculated as a percentage or number, such as 0-100.

In accordance with embodiments of the present invention, the clusters may be detected using different clustering techniques. Each of the clustering techniques relies on at least one method for measuring the distance or inverse correlation between two students, for example, a modified Mahalanobis distance using selected student profile values, lesson and problem result values, and event stream data for the students. For example, a distance measurement might be based on success with a particular problem type, success at a particular lesson and lack of success at a particular problem type within the lesson, or first derivative of response speed for successfully completed problems of a particular type. Note that there is not a single distance measurement used in clustering—rather, the system will select multiple, different distance measurements over time in order to gain as much information as possible about the natural clusters of students. As in the process of fitting a model to the data, the system can iterate until it finds the best distance measures that provide meaningful clusters.

Figure 4:
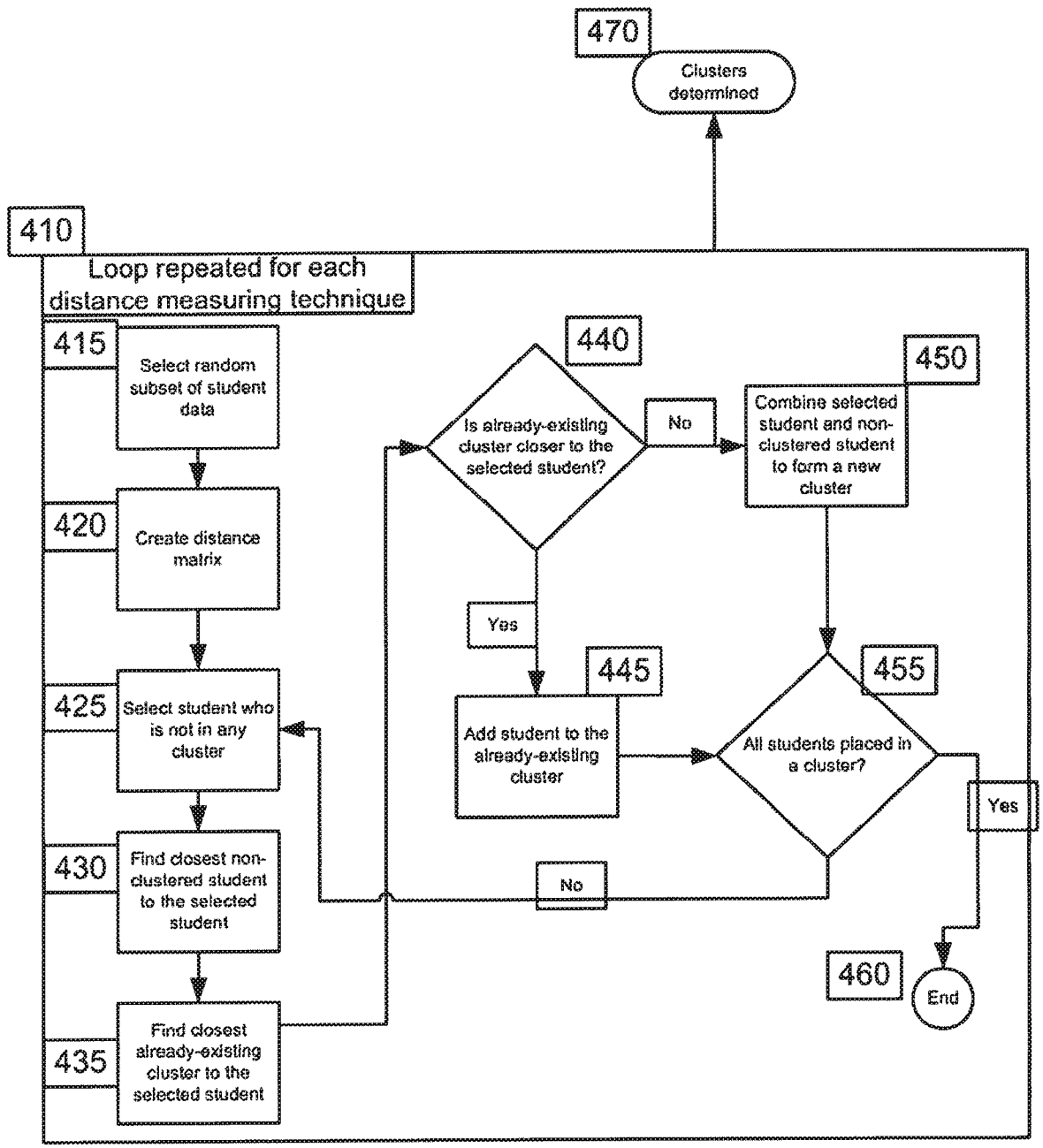
FIG. 4 shows an exemplary process for the detection of clusters of students through data mining, in accordance with one embodiment of the invention.

FIG. 4 shows such an exemplary process 400 for the detection of clusters of students through data mining, in accordance with one embodiment of the invention. Referring to FIG. 4, in step 410, a number of substeps is repeated for each of the distance measuring techniques chosen to be tested. In step 415, a random but representative subset of the student data is selected. In step 420, a distance matrix of the subset student data, in which the distance value from every student to every other student within the subset student data, is created. In step 425, a student that has not been put into a cluster is selected. In step 430, the closest already-existing cluster to the selected student is found, using an algorithm such as average distance calculation, in which the cluster's value for any value being tested by the distance measurement technique is assumed to be the average of all such values for all students in the cluster. In step 435, the closest non-clustered student to the selected student is found. In step 440, the distances to the already-existing cluster and the non-clustered student are compared. If the already-existing cluster is closer to the selected student, in step 445, the selected student is added to that cluster. Otherwise, in step 450, the selected student and the non-clustered student are combined into a new cluster. In either case, in step 455, the subset student data is examined to see if all students have been placed in a cluster. If not, the process returns to step 425. Otherwise, in step 460, the subprocess ends and the loop continues with the next distance measuring technique being tested. When all distance measuring techniques have been tested, in step 470, the process ends with a set of clusters determined according to the distance measurement techniques used.

Note that this process performs clustering on a single distance technique at a time and does not iterate after all students have been placed into clusters. In most embodiments, multiple distance techniques will be used at the same time and the process will recurse as necessary to promote clusters. In the case of fuzzy clustering, a student's degree of measurement in a cluster might be calculated by measuring the distance of the student from the cluster, using an algorithm such as that described in the description of step 430 above. But, in any case, the basic process is similar to that described in FIG. 4.

The correctness or otherwise of particular student responses is determined, in one embodiment, by the assessments engine 116. The assessments engine 116 may also determine whether a particular student has met the standards defined in the standards database 126 for the student.

In some embodiments, in addition to adapting a lesson based on a learner's membership in a particular cluster, the lesson adapter 118 may also use information from the learner's own personal profile, including whatever has been learned about the learner's relative success with different learning styles or methods of teaching.

As an example, in early mathematics, it is known that most children have an easier time learning the concept of more than the concept of less. Similarly, most children have an easier time learning addition than they do learning subtraction. In traditional teaching and in educational software known to the inventors, this fact that applies to most children gets applied to all children, so more is taught before less and addition is taught before subtraction. This works for most students because they can leverage what they find easier to learn what they find harder. In accordance with the above-described techniques of the present invention, a cluster of students would be detected with similar outcomes in these lessons. The detection of this unnamed cluster of students makes it possible to apply adaptations as will be discussed later.

As noted elsewhere, there is not a single sequence of lessons for all students and students usually have some control over which lesson they do at any given time. This means that different students may get lessons in different orders, in what may be referred to as micro-sequences of lessons. The micro-sequences may be of any length and some such micro-sequences may be more effective or less effective than others, and some may be more effective or less effective for certain clusters of students.

The data mining described above can also identify such micro-sequences of lessons, rate them in their effectiveness, and relate them to clusters of students. As a result, the probability that a lesson will be made available to a student can be altered based on its perceived effectiveness in a given situation, possibly for a given cluster of students.

Again, this information can be combined with information from the student's own personal data, including whatever has been learned about the student's relative success with different learning styles or methods of teaching. For example, a given student might be more successful with certain such micro-sequences than other students. Of course, this student would naturally cluster with other similar students, but the student's own relative success, relative to the cluster's success, could be used to determine which lessons are most likely to be successful.

In summary, the system 104 can recognize that adaptation can or should occur for all students, for all students in a particular cluster of students with similar experiences, or for a particular student, based on their personal profile.

Inter-Lesson Adaptation

As a result of the data mining discussed above, the system 104 can determine that a given student is are more or less likely to be successful with certain lessons at a particular point in time. As a result, the system 104 could adapt in a number of ways, including, but not limited, to, altering a specified sequence of lessons to change the order of the lessons, switching to a different sequence of lessons, splitting lessons into multiple lessons, combine multiple lessons into a single lesson, and skipping lessons.

Continuous Adaptation

In other systems known to the inventors, adaptations are made in response to errors, or adaptations are made to reflect a known learning style of the student. In contrast to these inflexible approaches, embodiments of the present invention treat adaptation as a continuum and there is continuous adapting and re-adapting to the needs of the student, even between problems. Thus, in the system 104 of the present invention adaptation is the norm, not an exception. Moreover, in accordance with the adaptation techniques described herein there are no preconceived notions of learning styles with the result that clusters are more flexible and dynamic.

As described above, at any given time, there is a large amount of information available about each student, what the student is currently doing, the student's history or profile, the history of other students the student is similar to, and the body of students as a whole. This information is mined to predict how the student will respond. During each lesson every response by the student is noted and added to the body of knowledge relevant to the student in the lesson. Since the data changes during a lesson or throughout the course of multiple lessons, the prediction can change as well. Thus, at the beginning of a lesson, the lesson might provide extra hinting or assistance and this hinting or assistance might be removed as the student learns. Similarly, the mix of types of problems might be changed during the lesson to give greater concentration to the problem types that the students need more work on or is less comfortable with. Using this method, these adaptations become as natural to the student as the assistance that might be given by a skilled teacher.

Each component in the system may provide one or more adaptation axes along which adaptation can occur. At one end of such an adaptation, no accommodation is made; at the other end, a great deal of accommodation is made. For example, a component for teaching multiplication might provide no hint at one extreme and a 3-dimensional visual representation of the multiplication operation at the other extreme. Or a component which simulates a physical object such as an abacus might provide a graphical representation of a desired state in order to aid the student in using the object to reach that state. Each such adaptation axis is defined in the context of the component in question and the adaptations that are provided are those which will assist a student in learning the subject in question.

In addition, the system itself can adapt a lesson in a number of ways, including, but not limited to, changing the length of a lesson, giving the student a break or a digression, repeating a portion of a lesson, changing the difficulty level, types or mix of problems being given, and providing a tutorial.

All of these adaptations are provided to lessons automatically by the system and lesson authors do not need to write them, though they may configure them, by placing limits or parameters on adaptations. They might want to do this, for example, in an advanced lesson that uses a tool shared by an earlier lesson. In such a lesson, a maximal adaptation might be undesirable since, if the student needs such a maximal adaptation in order to learn, they might be better served by an earlier lesson.

Intra-Lesson Adaptations

Adaptation within a lesson means a change in any aspect of a lesson being delivered, through the overall system or through any tool used to deliver a lesson. A number of such adaptations have been described previously. Additional adaptations include, but are not limited to the following:

The pacing of the lesson can be changed.

Feedback given to the student, including, but not limited to, sounds, volume, visuals, visual effects, and animation, can be changed.

The on-screen layout or visible content of a lesson can be changed.

The size or format of text or other on-screen elements of the lesson can be changed.

The emphasis of on-screen elements, including, but not limited to, appearance, highlighting, color, appearance, and animation, can be changed. An alternate version of on-screen element can be substituted. An on-screen element can be added or removed. An on-screen element can cause a different on-screen element to be added or removed. Other on-screen elements could be faded, disabled, or otherwise modified.

An on-screen annotation of a value, partial value, answer, partial answer, or information related to a problem or question, possibly superimposed over an on-screen element, can be supplied.

An audio annotation of a value, partial value, answer, partial answer, or other information related to a problem, question, or answer can be supplied.

Positive and negative reinforcement given to the student, including, but not limited to, increasing or decreasing the content, or modifying the types of such reinforcement, can be changed.

How answers are disambiguated for students can be changed.

What hints are given and how they are given can be changed.

An alternate response can be provided for a particular on-screen element. For example, the mouseover effect on a correct answer might be animated or have a sound effect whereas the mouseover effect on an incorrect answer might be simpler.

With any adaptation, adaptations can be made under lesson control or they may be continuous adaptations under system control, as described earlier. For adaptations under lesson control, they may be done in response to events that occur or they may be set to happen automatically under certain conditions.

With any adaptation, the adaptation can be made momentarily, for the duration of a problem or longer, or it may be turned and kept on until it is turned off.

With any adaptation, the adaptation can replace an earlier adaptation instead of adding to it.

With any adaptation involving on-screen elements, the adaptation itself can be sequenced through the elements, as in successive highlighting of a number of options. For example, counting off a number of items, or successively highlighting or reading the words in a story.

Returning to an example used earlier in this description, there is the case in early mathematics where most children have an easier time learning addition than subtraction. The goal is that students need to be able to solve both types of problem without assistance, but most students can leverage their knowledge of addition to learn subtraction and this fact may be used to help them learn. As noted previously, clusters of students would be detected with similar outcomes in lessons about addition and subtraction. The intra-lesson adaptation makes this detection even more relevant because the system will detect clusters of students that perform better when a subtraction problem is given before an addition problem. The system need not know why this is the case—only that it is the case and the system can then leverage this information to help those students learn. Further, the system can predict this behavior in advance of the student even entering such a lesson, by observing which other students the student is most similar to.

Note that this predictive adaptation combines with adaptation which occurs within a lesson, in response to immediate actions by the student.

Multi-Lesson Adaptations

Another feature of the present invention is planning a complete lesson sequence for a student, in advance, based upon all the currently-available lesson information. Such a sequence might be recalculated at particular interval. The spacing between the intervals may or may not be fixed, in accordance with different embodiments of the invention.

Another feature of the present invention is planning one or more projected sequences of lessons in order to download more lessons to the student in advance. By planning such lesson sequences, the system is able to predict which lessons are most likely to be chosen by the student and download the content for those lessons in advance of them being chosen, thus minimizing any delays that might occur because of un-downloaded content.

Student Profile

A feature of the present invention is the maintenance of a "student profile" based not upon asking a student what his/her preferred learning style is, but upon calculated information about his/her preferred style in a wide variety of contexts. Advantageously, the system 104 adjusts this information on an ongoing basis as new information about the student is received through the course of progress in lessons. Thus, the system 104 is able to deal with learning styles which may be highly contextual and for which there are no names available. It also does not require any knowledge of learning styles on the part of any student or anyone else.

In one embodiment the system 104 system advantageously allows researchers to conduct experiments on historical data, to construct and offer experiments for current students in real time, to conduct such experiments without adversely affecting the quality of the educational materials delivered to the students, and to combine the analysis of such new experiments with historical data.

By way of example, one such experiment may include what is known as an "A/B test". In an A/B test one subset (the A group) of the students receives a modified lesson, while the remaining students (the B group, also called the control group) receive the standard or an alternate lesson. Given a large enough student population, multiple A/B tests can be run simultaneously and the system can analyze data from them independently. Scientific research favors such A/B tests, but other types of experiments are also possible.

Figure 5:
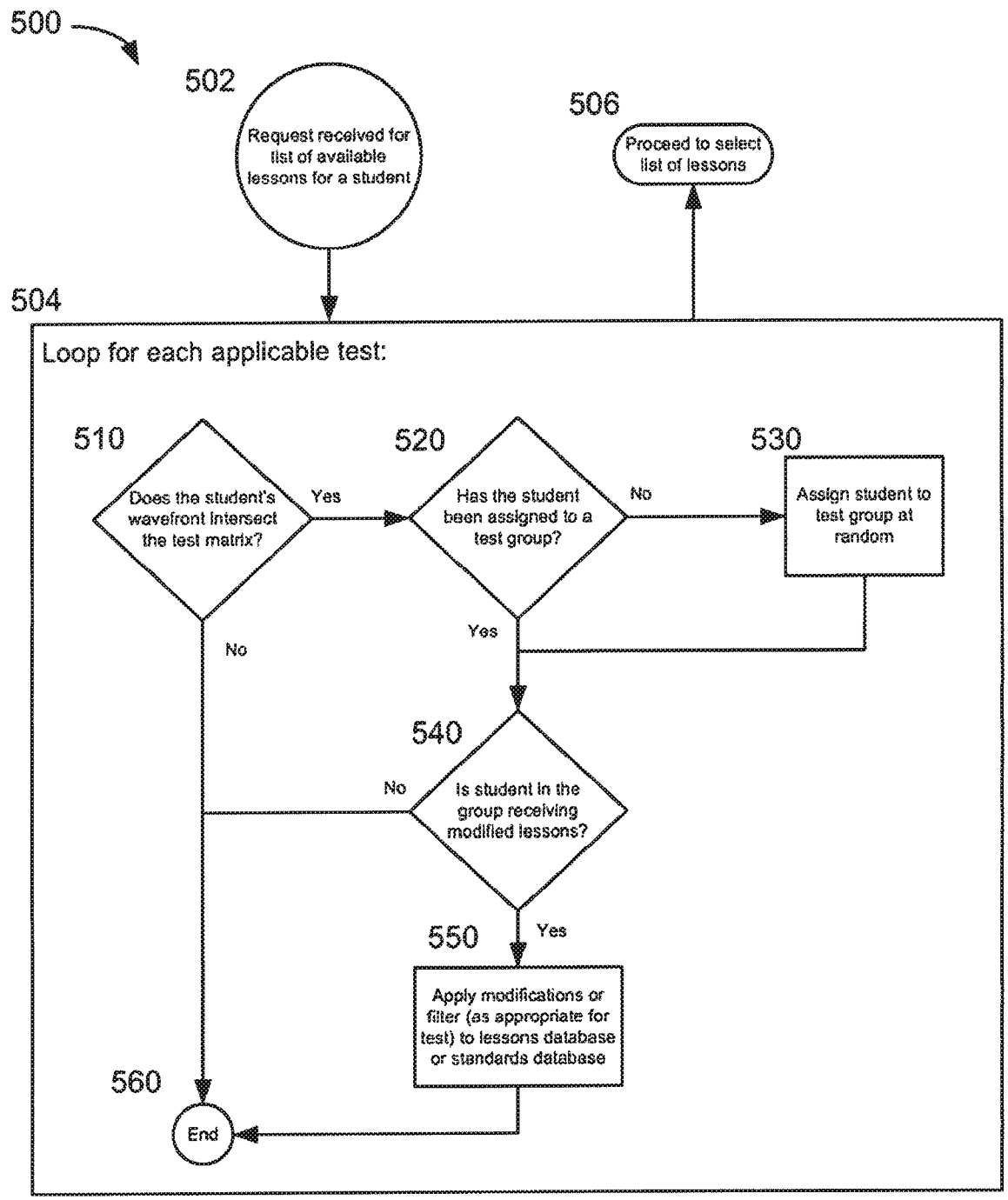
FIG. 5 shows an exemplary process for running an A/B test, in accordance with one embodiment of the invention.

FIG. 5 of the drawings shows an exemplary process 500 for running an A/B test, in accordance with one embodiment. In step 502, a request is received for a list of available lessons for a student. In step 504, a number of substeps are repeated for each of the tests known to the system that applies to the student. In step 510, the student's current wavefront of lessons is interesected with the text matrix. If they do not intersect, the subprocess ends in step 560 and the loop moves on to the next applicable test. Otherwise, in step 520, the student's profile is examined to see if the student has been assigned to a group for the test. If not, in step 530, the student is assigned to a test group at random and this information is stored in the student profile. In either case, processing continues at step 540. In step 540, which group the student has been assigned to is inspected. If the student is not in the group receiving modified lessons, the subprocess ends in step 560 and the loop moves on to the next applicable test. Otherwise, in step 550, the modifications or filter that are appropriate for the test are applied to the lessons database and/or the standards database in such a way that any access of them for the subsequent purpose of selecting the list of lessons for the student causes the modified data to be used. Note that, in essence, an A/B test always involves alternative lessons, but the test may introduce new lessons, the lessons may be modifications of existing lessons, or the test can be on how, why, or when a lesson is offered to a student. Next, the process ends in step 360 and the loop moves on to the next applicable test. When all applicable tests have been checked, the loop 504 terminates and processing continues with step 506, where the process terminates by proceeding to select the list of lessons for the student.

In alternate embodiments to the one shown in this exemplary process, the students could be assigned to test groups in advance, or they could be assigned to test groups by some formula. In addition, there may be more than two alternatives and it is possible for multiple or all alternatives to introduce modifications to the lessons database and/or the standards database. In another alternative embodiment, the system could dynamically alter the groups of students, or the distribution of assignment into the groups of students, as information about the relative success of the alternative lessons was learned.

Once an A/B test has been run, no special work is necessary to analyze the results. Instead, the results of the test are automatically analyzed along with all other results, using the techniques described above. This means that, if the A/B test was successful (meaning the alternative was more successful with some or all students), the system will have learned it. At this point, the test may be turned off and the alternative lessons or changes to lessons can be introduced into the system. To study the results of an A/B test, a researcher need only examine the data mining results to see the relative success of the alternative lessons.

Because some jurisdictions may prohibit or regulate such experiments, such as by having laws that require consent and/or parental consent for such experimentation, embodiments of the present invention necessarily integrate a multistage consent model into the system 104.

FIG. 6 of the drawings shows an example of hardware 600 that may be used to any of the client systems 104 and the server system 106, in accordance with one embodiment of the invention. The hardware 600 typically includes at least one processor 602 coupled to a memory 604. The processor 602 may represent one or more processors (e.g., microprocessors), and the memory 604 may represent random access memory (RAM) devices comprising a main storage of the hardware 600, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, heart rate monitor, camera, etc.) and a one or more output devices 608 (e.g., a Liquid Crystal Display (LCD) panel, a sound playback device (speaker), a haptic device, e.g. in the form of a braille output device).

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 70 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc. to implement the techniques described above. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for a computing system to adapt educational content for delivery to a student, the method comprising:
   aggregating, with the computing system, data for each of a plurality of students to form a combined data set, the combined data set characterizing interactions of the students with an educational system while responding to questions presented by the educational system, the interactions of the students with the educational system including steps taken to resolve the presented questions, the questions associated with an objective within the educational system that was completed by the students,
   wherein aggregating the data comprises receiving the data in the form of a plurality of event streams for each student from an event stream recorder associated with a plurality of client devices and combining the multiple event streams into a combined data set stored in an event stream database,
   wherein each of the event streams comprises data pertaining to aspects of a particular student's interactions with the system including student-generated events and system-generated events, and
   wherein the student-generated events are selected from the group consisting of mouse clicks, pen clicks, pointing-device motion, and keystrokes, via one or more computer-implemented input devices;
   automatically fitting, with the computing system, the combined data set with one or more mathematical models using fuzzy clustering to generate multiple clusters of students having similar skills, each cluster identified by a grouping of students having similar accuracy in responses to the questions and similar interactions with the educational system via the one or more computer-implemented input devices while responding to the questions,
   wherein the one or more mathematical models include a predictive model that is trained, using a training data set, to predict an expected response trait;
   receiving, with the computing system, responses to at least some of the questions from a new student that is working towards the objective within the educational system and continuously monitoring, with the computing system, interactions of the new student with the educational system while responding to the at least some of the questions, the monitored interactions of the new student including at least one of mouse clicks, pen clicks, pointing device motion, or keystrokes, via one or more computer-implemented input devices;
   associating, with the computing system, the new student with one of the multiple clusters of students using fuzzy clustering based on the received responses and the interactions of the new student via the one or more computer-implemented input devices while responding to the questions; and
   continuously adapting and presenting, with the computing system, questions to the new student based in part on the cluster of students with which the new student is associated to provide a customized learning experience for the new student,
   wherein continuously adapting and presenting the questions to the new student is further based on a student profile for the new student that is continuously updated based on the continuous monitoring of the new student, the student profile including calculated information characterizing a learning style of the new student.

2. The method of claim 1, further comprising predicting an expected accuracy when resolving the questions for the new student based on the cluster of students that the new student is associated with.

3. The method of claim 1, wherein adapting the questions comprises generating a micro-sequence of lessons to present to the new student.

4. The method of claim 3, wherein the micro-sequence of lessons comprises multiple lessons from which the new student can choose a lesson.

5. The method of claim 3, wherein generating the micro-sequence comprises selecting the micro-sequence from a set of micro-sequences assigned to the associated cluster, the selection being based on an evaluation of an effectiveness of the micro-sequences in the set.

6. The method of claim 3, wherein generating said micro-sequence comprises at least one of altering an existing micro-sequence and creating a new micro-sequence.

7. The method of claim 1, wherein adapting the questions comprises at least one of splitting a lesson into multiple lessons, combining multiple lessons into a single lesson, and skipping lessons based on the new student's associated cluster.

8. The method of claim 1, further comprising associating the new student with a plurality of the multiple clusters.

9. The method of claim 1, wherein each cluster is further identified by a learning style associated with the students in the cluster.

10. The method of claim 1, wherein each of the multiple clusters is based on a situation-dependent differentiation criterion.

11. The method of claim 10, wherein the situation-dependent differentiation criterion is selected from the group consisting of age, subject matter, gender, school district, and geographic location.

12. The method of claim 1, wherein each of the event streams further comprises biometric information pertaining to at least some of the plurality of students.

13. The method of claim 1, wherein the system-generated events comprise a history of every screen, problem, image, audio, and video element the educational system generated for at least some of the plurality of students.

14. The method of claim 12, wherein the biometric information is selected from the group consisting of heart rate information, respiration information, eye movement information, and stress level information for at least some of the plurality students.

15. The method of claim 1, wherein each of the event streams further include a response time for each question, whether a student requested a hint for each question, and derivatives of the response time for each question.

16. The method of claim 1, wherein adapting the questions is performed automatically without human intervention.

17. The method of claim 1, wherein adapting the questions is performed at least in part by a client system that is communicatively coupled to the computing system.

18. The method of claim 1, wherein the interactions with the educational system while responding to the questions include whether hints are requested after one or more of the questions are presented.

19. The method of claim 1, wherein the predictive model is trained using a set of coefficients to iteratively compare an output of the predictive model to a training dataset and adjust the predictive model based on a coefficient of the set of coefficients having a highest correlation to the training dataset, the method further comprising:
predicting, using the predictive model, the expected response trait when adapting the questions for the new student based on the cluster of students with which the new student is associated.

20. The method of claim 1, wherein adapting the questions delivered to the new student comprises adapting a type of question and adapting a manner of delivery of the question.

21. One or more computing systems for adapting educational content for delivery to a student, the one or more computing systems comprising:
one or more non-transitory computer-readable storage mediums storing computer-executable instructions for controlling the one or more computing systems to:
aggregate data for each of a plurality of students to form a combined data set, the combined data set characterizing interactions of the students with an educational system while responding to questions presented by the educational system, the interactions of the students with the educational system including steps taken to resolve the presented questions, the questions associated with an objective within the educational system that was completed by the students,
wherein aggregating the data comprises receiving the data in the form of a plurality of event streams for each student from an event stream recorder associated with a plurality of client devices and combining the multiple event streams into a combined data set stored in an event stream database,
wherein each of the event streams comprises data pertaining to aspects of a particular student's interactions with the system including student-generated events and system-generated events, and
wherein the student-generated events are selected from the group consisting of mouse clicks, pen clicks, pointing-device motion, and keystrokes, via one or more computer-implemented input devices;
automatically fit the combined data set with one or more mathematical models using fuzzy clustering to generate multiple clusters of students having similar skills, each cluster identified by a grouping of students having similar accuracy in responses to the questions and similar interactions with the educational system via the one or more computer-implemented input devices while responding to the questions,
wherein the one or more mathematical models include a predictive model that is trained, using a training dataset, to predict an expected response trait;
receive responses to at least some of the questions from a new student that is working towards the objective within the educational system and continuously monitor interactions of the new student with the educational system while responding to the at least some of the questions, the continuously monitored interactions of the new student including at least one of mouse clicks, pen clicks, pointing device motion, or keystrokes, via one or more computer-implemented input devices;
associate the new student with one of the multiple clusters of students using fuzzy clustering based on the received responses and the interactions of the new student via the one or more computer-implemented input devices while responding to the questions; and
continuously adapt and present questions to the new student based in part on the cluster of students with which the new student is associated to provide a customized learning experience for the new student, wherein continuously adapting and presenting the questions to the new student is further based on a student profile for the new student that is continuously updated based on the continuous monitoring of the new student, the student profile including calculated information characterizing a learning style of the new student; and one or more processors for executing the computer-executable instructions stored in the one or more computer-readable storage mediums.

22. The one or more computing systems of claim 21, wherein the computer-executable instructions further control the one or more computing systems to predict an expected accuracy when resolving the questions for the new student based on the cluster of students that the new student is associated with.

23. The one or more computing systems of claim 21, wherein adapting the questions comprises generating a micro-sequence of lessons to present to the new student.

24. The one or more computing systems of claim 23, wherein the micro-sequence of lessons comprises multiple lessons from which the new student can choose a lesson.

25. The one or more computing systems of claim 23, wherein generating said micro-sequence comprises selecting the micro-sequence from a set of micro-sequences assigned to the associated cluster, the selection being based on an evaluation of an effectiveness of the micro-sequences in the set.

26. The one or more computing systems of claim 23, wherein generating the micro-sequence comprises at least one of altering an existing micro-sequence and creating a new micro-sequence.

27. The one or more computing systems of claim 21, wherein adapting the questions comprises at least one of splitting a lesson into multiple lessons, combining multiple lessons into a single lesson, and skipping lessons based on the new student's associated cluster.

28. The one or more computing systems of claim 21, wherein the computer-executable instructions further control the one or more computing systems to associate the new student with a plurality of the multiple clusters.

29. The one or more computing systems of claim 21, wherein each cluster corresponds to a learning style associated with the students in the cluster.

30. The one or more computing systems of claim 21, wherein each of the multiple clusters is based on a situation-dependent differentiation criterion.

* * * * *